US012693695B2

(12) United States Patent
Huang et al.

(10) Patent No.: US 12,693,695 B2
(45) Date of Patent: Jul. 28, 2026

(54) ELECTRONIC SYSTEM USING A POWER REGULATOR WITH REDUCED INRUSH CURRENT

(71) Applicant: MEDIATEK INC., Hsinchu City (TW)

(72) Inventors: Chih-Chien Huang, Hsinchu City (TW); Ming-Chiang Ting, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 557 days.

(21) Appl. No.: 18/320,442

(22) Filed: May 19, 2023

(65) Prior Publication Data

US 2024/0012438 A1 Jan. 11, 2024

Related U.S. Application Data

(60) Provisional application No. 63/367,656, filed on Jul. 5, 2022.

(51) Int. Cl.

| | |
|---|---|
| ***G05F 1/575*** | (2006.01) |
| ***G05F 1/46*** | (2006.01) |
| ***G05F 1/565*** | (2006.01) |
| ***G05F 1/573*** | (2006.01) |
| ***G05F 1/577*** | (2006.01) |

(52) U.S. Cl.

CPC .............. *G05F 1/575* (2013.01); *G05F 1/468* (2013.01); *G05F 1/565* (2013.01); *G05F 1/573* (2013.01); *G05F 1/577* (2013.01)

(58) Field of Classification Search

CPC ... G05F 1/10; G05F 1/46; G05F 1/468; G05F 1/56; G05F 1/565; G05F 1/571; G05F 1/573; G05F 1/575; G05F 1/577; G05F 1/59; H02M 3/156; H02M 3/158; H02J 7/0063; H02J 2207/20

See application file for complete search history.

(56) References Cited

U.S. PATENT DOCUMENTS

| | | | | |
|---|---|---|---|---|
| 8,901,904 | B2 * | 12/2014 | Caldwell | G05F 1/56 323/285 |
| 9,645,591 | B2 | 5/2017 | Roham | |
| 2007/0252566 | A1 | 11/2007 | Honda et al. | |

(Continued)

OTHER PUBLICATIONS

Extended European Search Report dated Dec. 7, 2023, issued in application No. EP 23177357.3.

(Continued)

*Primary Examiner* — Thienvu V Tran
*Assistant Examiner* — Shahzeb K Ahmad
(74) *Attorney, Agent, or Firm* — McClure, Qualey & Rodack, LLP

(57) ABSTRACT

An electronic system using a power regulator with reduced inrush current is shown. An output capacitance device that is coupled between the power regulator and the load has a first capacitor and a second capacitor. When the power regulator is in the first power mode, the first capacitor and the second capacitor are both coupled to the power regulator. When the power regulator is in the second power mode, which uses less power than the first power mode, the first capacitor is still coupled to the power regulator, but the second capacitor is disconnected from the power regulator and is protected from being discharged by the power regulator.

16 Claims, 3 Drawing Sheets

(56) References Cited

U.S. PATENT DOCUMENTS

| | | | | |
|---|---|---|---|---|
| 2010/0026252 | A1* | 2/2010 | Lin | G05F 1/56<br>323/275 |
| 2013/0249505 | A1* | 9/2013 | Brown | H02M 3/156<br>323/223 |
| 2014/0210430 | A1* | 7/2014 | Bhattad | H03F 3/04<br>330/129 |
| 2015/0192943 | A1* | 7/2015 | Roham | G05F 1/575<br>323/273 |
| 2017/0052552 | A1* | 2/2017 | Mahmoudi | G05F 1/575 |
| 2020/0028435 | A1* | 1/2020 | Kim | H03F 1/025 |

OTHER PUBLICATIONS

Kaknevicius, A., et al.; "Managing Inrush Current;" Texas Instruments; Aug. 2014; pp. 1-13.

* cited by examiner

ELECTRONIC SYSTEM USING A POWER REGULATOR WITH REDUCED INRUSH CURRENT

CROSS REFERENCE TO RELATED APPLICATIONS

This application claims the benefit of U.S. Provisional Application No. 63/367,656, filed Jul. 5, 2022, the entirety of which is incorporated by reference herein.

BACKGROUND OF THE INVENTION

Field of the Invention

The present invention relates to power regulation techniques.

Description of the Related Art

A power regulator is a DC-to-DC power converter or Low Dropout regulator LDO which converts a power voltage (e.g., received from a battery) to an output voltage to drive a load.

An inrush current may take place when switching a power regulator from a power-off mode to a power-on mode. When a dynamic voltage scaling (DVS) function is enabled, inrush current may also occur when switching the power regulator from the low-power mode to the normal-power mode.

How to reduce the inrush current is an important topic in this technical field.

BRIEF SUMMARY OF THE INVENTION

An electronic system using a power regulator with reduced inrush current is shown.

An electronic system in accordance with an exemplary embodiment of the present invention has a power regulator, and an output capacitance device that is coupled between the power regulator and a load. The output capacitance device has a first capacitor and a second capacitor. When the power regulator is in the first power mode, the first capacitor and the second capacitor are both coupled to the power regulator. When the power regulator is in the second power mode, which uses less power than the first power mode, the first capacitor is still coupled to the power regulator, but the second capacitor is disconnected from the power regulator and is protected from being discharged by the power regulator.

Thus, while the power regulator operates in the second power mode, a considerable charge is stored within the second capacitor. When the power regulator is switched back to the first power mode to raise up its output voltage, the inrush current is reduced due to the charge held by the second capacitor.

In an exemplary embodiment, the first power mode is a power-on mode, and the second power mode is a power-off mode.

In another exemplary embodiment, the first power mode is the normal-power mode of a dynamic voltage scaling (DVS) function, and the second power mode is the low-power mode of the DVS function.

In an exemplary embodiment, the electronic system further has a charge supplier, which is coupled to the second capacitor while the power regulator operates in the second power mode, to compensate for leakage from the second capacitor.

In an exemplary embodiment, the power regulator has a first power MOS transistor and a second power MOS transistor. The first power MOS transistor has a source terminal coupled to a power voltage, and a drain terminal coupled to the first capacitor through the first output terminal of the power regulator. The second power MOS transistor has a source terminal coupled to the power voltage, a gate terminal coupled to the gate terminal of the first power MOS transistor, and a drain terminal coupled to the second capacitor through the second output terminal of the power regulator. The second power MOS transistor is turned off while the power regulator operates in the second power mode.

In an exemplary embodiment, the power regulator further has a charge supplier that is powered by the power voltage. While the power regulator operates in the second power mode, the charge supplier is coupled to the second capacitor through the second output terminal of the power regulator to compensate for leakage from the second capacitor.

In an exemplary embodiment, the charge supplier has a current source, driven by the power voltage to compensate for leakage from the second capacitor.

In an exemplary embodiment, the charge supplier further has a switch, and a comparator. While the power regulator operates in the second power mode, the switch is turned on to couple the current source to the second capacitor through the second output terminal of the power regulator. The comparator generates a control signal to control the current source. The comparator has a first input terminal coupled to the second output terminal of the power regulator through the switch, and a second input terminal biased at a reference voltage.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
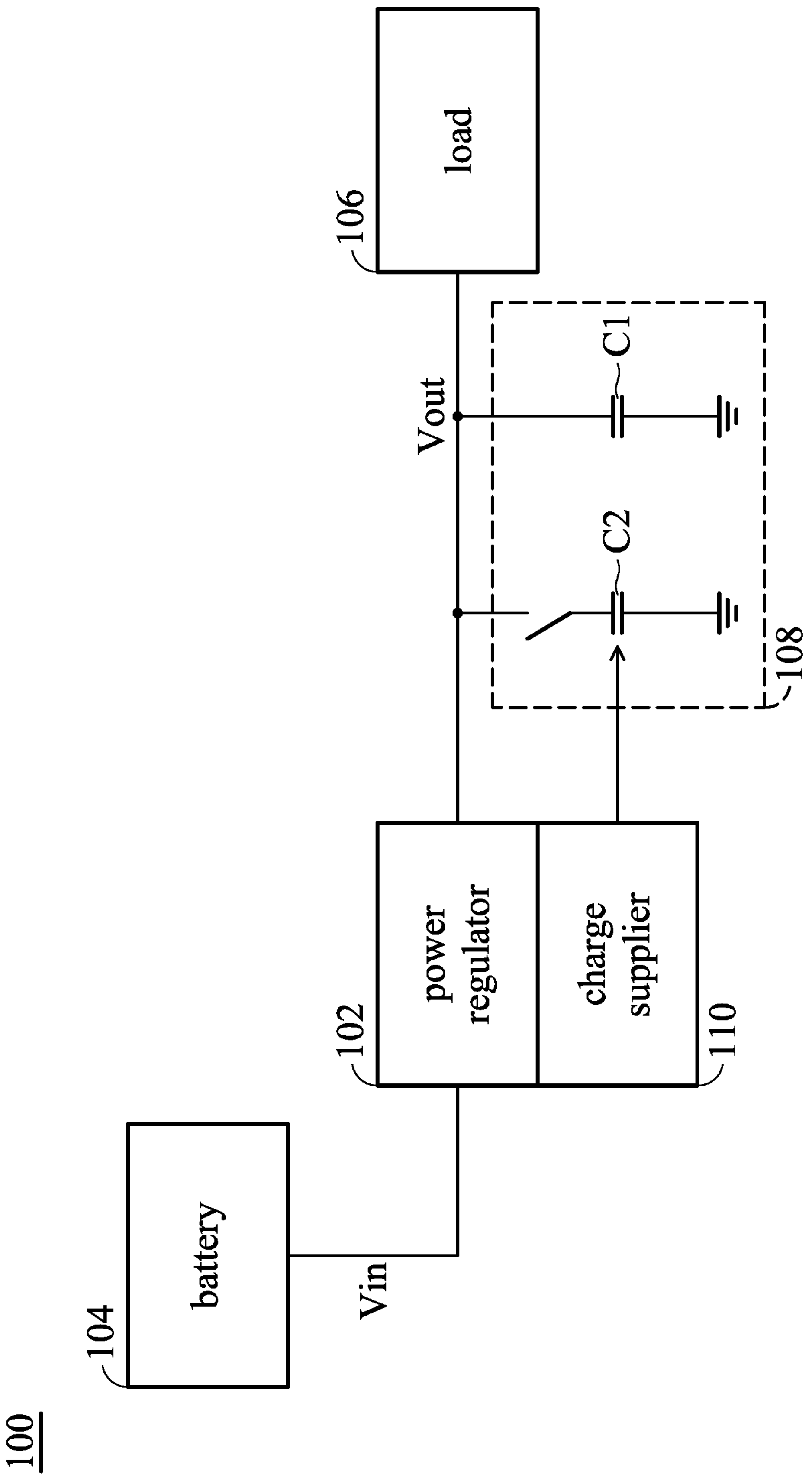
FIG. 1 is a block diagram depicting an electronic system 100 in accordance with an exemplary embodiment of the present invention.

FIG. 1 is a block diagram depicting an electronic system 100 in accordance with an exemplary embodiment of the present invention, which may be a cell phone, a tablet, or any mobile electronic device. The electronic system 100 uses a power regulator 102 to convert a power voltage Vin to an output voltage Vout to drive a load 106. The power voltage Vin may be provided by a battery 104 of the electronic system 100. The load 106 may be a central processing unit (CPU) or any chip in the electronic system 100.

The electronic system 100 further has an output capacitance device 108 that is coupled between the power regulator 102 and the load 106. Instead of being implemented by one single capacitor, the output capacitance device 108 has a first capacitor C1 and a second capacitor C2. The power regulator 102 can be switched between different power modes. In the different power modes, the capacitors C1 and C2 are coupled to the power regulator 102 in the different ways.

In an exemplary embodiment, the power regulator 102 can be switched between the first power mode and the second power mode. The output voltage Vout in the first power mode is greater than that in the second power mode. The second power mode is more power saving than the first power mode. While the power regulator 102 operates in the first power mode, the first capacitor C1 and the second capacitor C2 are both coupled to the power regulator 102, and both are coupled to the load 106. While the power regulator 102 operates in the second power mode, the first capacitor C1 is still coupled to the power regulator 102 and the load 106, but the second capacitor C2 is disconnected from the power regulator 102 and the load 106. In the second power mode, the second capacitor C2 is protected from being discharged by the power regulator 102.

In this manner, while the power regulator 102 operates in the second power mode, which uses less power than the first power mode, a considerable amount of charge is held in the isolated second capacitor C2. When the power regulator 102 is switched back to the first power mode to raise the output voltage Vout, the second capacitor C2 is reconnected to the power regulator 102. Because of the charges previously stored in the second capacitor C2, the power regulator 102 switched back to the first power mode will not generate a huge inrush current.

In an exemplary embodiment, the first power mode is a power-on mode, and the second power mode is a power-off mode. In the power-off mode, the output voltage Vout is 0V. In the power-on mode, the output voltage Vout is Von volt. In a conventional technique, when switching a power regulator from the power-off mode to the power-on mode, the inrush charge, ΔQold, is Von*Ctotal, where Ctotal is C1+C2. However, in the electronic system 100, when switching the power regulator 102 from the power-off mode to the power-on mode, the inrush charge, ΔQnew, is Von*C1, much lower than ΔQold. The inrush current is significantly reduced. Less inrush charge is wasted.

In another exemplary embodiment, the power regulator 102 operates its dynamic voltage scaling (DVS) function. The first power mode is the normal-power mode, and the second power mode is the low-power mode. In the normal-power mode, the output voltage Vout is Vhigh volt. In the low-power mode, the output voltage Vout is Vlow volt. In a conventional technique, when switching a power regulator from the low-power mode to the normal-power mode, the inrush charge, ΔQold, is (Vhigh-Vlow)*Ctotal, where Ctotal is C1+C2. However, in the electronic system 100, when switching the power regulator 102 from the low-power mode to the normal-power mode, the inrush charge, ΔQnew, is (Vhigh-Vlow)*C1, much lower than ΔQold. The inrush current is significantly reduced. Less inrush charge is wasted.

As shown, the electronic system 100 further has a charge supplier 110. The charge supplier 110 is coupled to the second capacitor C2 while the power regulator 102 operates in the second power mode, to compensate for leakage from the isolated second capacitor C2. The battery 104 can also provide power to the charge supplier 104.

In some other examples, the second capacitor C2 is still coupled to the load 106 while the power regulator 102 operates in the second power mode.

Figure 2:
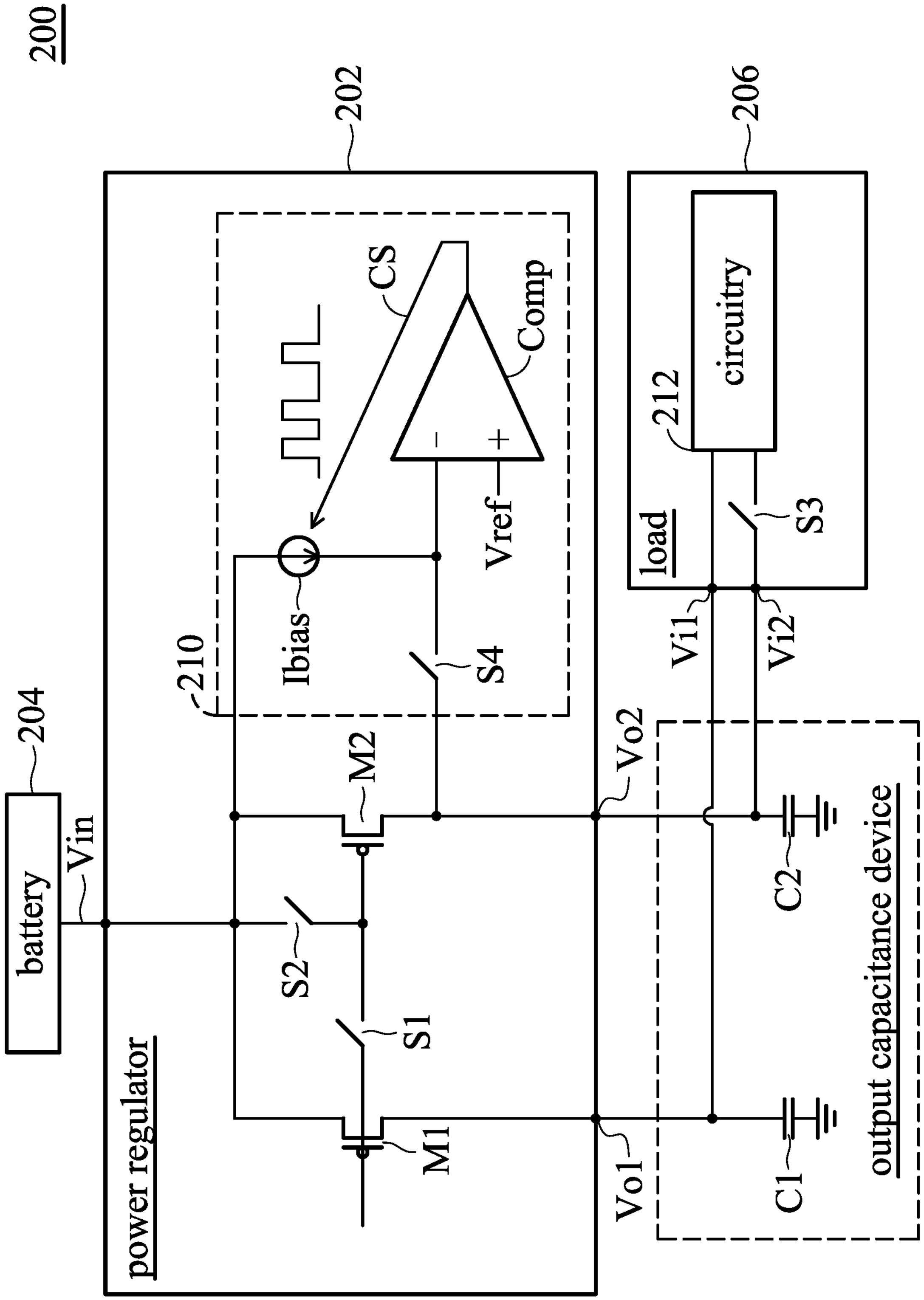
FIG. 2 depicts an electronic system 200 in accordance with another exemplary embodiment of the present invention.

FIG. 2 depicts an electronic system 200 in accordance with another exemplary embodiment of the present invention.

The power regulator 202 has a first power MOS transistor (e.g., a PMOS transistor) M1, and a second power MOS transistor (e.g., another PMOS) M2. The first power MOS transistor M1 has a source terminal coupled to the power voltage Vin, and a drain terminal coupled to the first capacitor C1 through the first output terminal Vo1 of the power regulator 202. The second power MOS transistor M2 has a source terminal coupled to the power voltage Vin, a gate terminal coupled to the gate terminal of the first power MOS transistor M1, and a drain terminal coupled to the second capacitor C2 through the second output terminal Vo2 of the power regulator 202. The second power MOS transistor M2 is turned off while the power regulator 202 operates in the second power mode, to disconnect the second capacitor C2 from the power regulator 202.

In this example, the power regulator 202 further has a first switch S1, and a second switch S2. The first switch S1 is coupled between the gate terminal of the first power MOS transistor M1 and the gate terminal of the second power MOS transistor M2. The first switch S1 is closed while the power regulator 202 operates in the first power mode, and is open while the power regulator 202 operates in the second power mode. The second switch S2 is closed while the power regulator 202 operates in the second power mode to couple the gate terminal of the second power MOS transistor M2 to the power voltage Vin. Thus, in the second power mode, the second power MOS transistor M2 is indeed turned off, and the second capacitor C2 is completely disconnected from the power regulator 202.

In FIG. 2, the load 206 has a first power terminal Vi1 coupled to the first output terminal Vo1 of the power regulator 202, and a second power terminal Vi2 coupled to the second output terminal Vo2 of the power regulator 202. The load 206 has circuitry 212, receiving power from the first power terminal Vi1 and the second power terminal Vi2. A third switch S3 is coupled between the second power terminal Vi2 and the circuitry 212. While the power regulator 202 operates in the first power mode, the third switch S3 is closed. While the power regulator 202 operates in the second power mode, the third switch S3 is open. The third switch S3 is optional.

FIG. 2 shows a charge supplier 210 incorporated into the power regulator 202. The charge supplier 210 is powered by the power voltage Vin provided by the battery 204. While the power regulator 202 operates in the second power mode, the charge supplier 210 is coupled to the second capacitor C2 through the second output terminal Vo2 of the power regulator 202 to compensate for leakage from the second capacitor C2.

The details of the charge supplier 210 are described in this paragraph. The charge supplier 210 has a current source Ibias, a fourth switch S4, and a comparator Comp. The current source Ibias is driven by the power voltage Vin. While the power regulator 202 operates in the second power mode, the fourth switch S4 is turned on to couple the current source Ibias to the second capacitor C2 through the second output terminal Vo2 of the power regulator 202, to compensate for leakage from the second capacitor C2. The comparator Comp is provided to generate a control signal CS to control the current source Ibias. The comparator Comp has a first input terminal '-' coupled to the second output terminal Vo2 of the power regulator 202 through the fourth switch S4, and a second input terminal '+' biased at a reference voltage Vref. In this structure, when the second capacitor C2 isolated from the power regulator 202 in the second power mode drops to the lower voltage level, the current source Ibias can adaptively compensate for the leakage loss.

Figure 3:
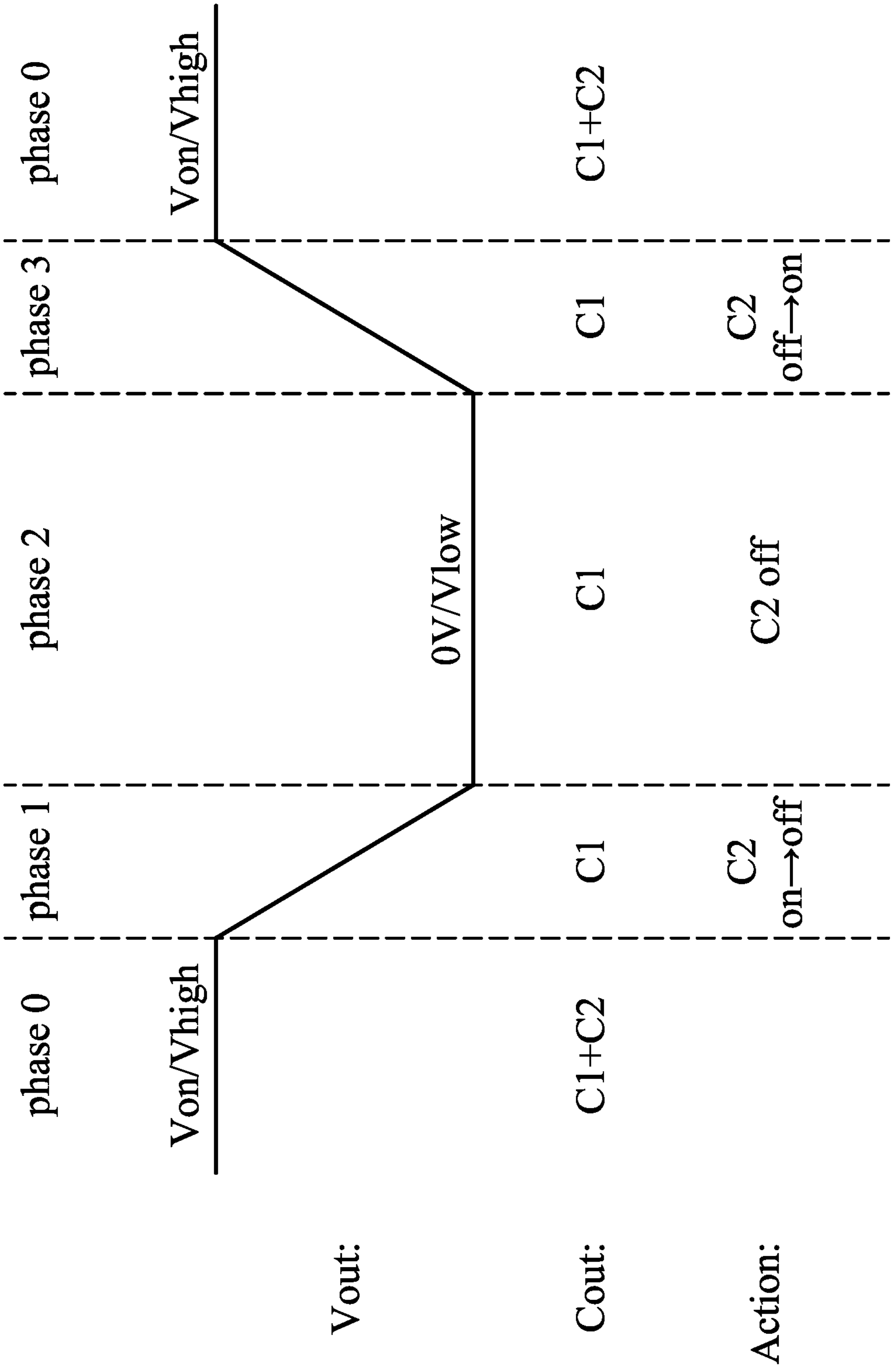
FIG. 3 illustrates the control scheme of the output capacitance device 108 in accordance with an exemplary embodiment of the present invention.

FIG. 3 illustrates the control scheme of the output capacitance device 108 in accordance with an exemplary embodiment of the present invention.

In phase 0, the power regulator 102 is in the first power mode. In phase 2, the power regulator 102 is in the second power mode. Phase 1 is a voltage-falling phase for switching from the first power mode to the second power mode. During phase 1, the second capacitor C2 is changed (from on to off) to be disconnected from the power regulator 102. Phase 3 is a voltage-rising phase for switching from the second power mode to the first power mode. During phase 3, the second capacitor C2 is changed (from off to on) to be coupled to the power regulator 102.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic system, comprising:

a power regulator; and an output capacitance device, coupled between the power regulator and a load;

wherein:

the output capacitance device comprises a first capacitor and a second capacitor;

when the power regulator is in a first power mode, the first capacitor and the second capacitor are both coupled to the power regulator;

when the power regulator is in a second power mode, which uses less power than the first power mode, the first capacitor is coupled to the power regulator, and the second capacitor is disconnected from the power regulator and is protected from being discharged by the power regulator; and the power regulator comprises:

a first power MOS transistor, having a source terminal coupled to a power voltage, and a drain terminal coupled to the first capacitor through a first output terminal of the power regulator;

a second power MOS transistor, having a source terminal coupled to the power voltage, a gate terminal coupled to a gate terminal of the first power MOS transistor, and a drain terminal coupled to the second capacitor through a second output terminal of the power regulator;

wherein the second power MOS transistor is turned off while the power regulator operates in the second power mode.

2. The electronic system as claimed in claim 1, wherein:

the first power mode is a power-on mode; and the second power mode is a power-off mode.

3. The electronic system as claimed in claim 1, wherein:

the first power mode is a normal-power mode of a dynamic voltage scaling function; and the second power mode is a low-power mode of the dynamic voltage scaling function.

4. The electronic system as claimed in claim 1, further comprising:

a charge supplier, coupled to the second capacitor while the power regulator operates in the second power mode, to compensate for leakage from the second capacitor.

5. The electronic system as claimed in claim 4, further comprising:

a battery, providing power to the charge supplier to compensate for leakage of the second capacitor.

6. The electronic system as claimed in claim 1, wherein:

while the power regulator operates in the first power mode, the first capacitor and the second capacitor are both further coupled to the load; and while the power regulator operates in the second power mode, the first capacitor is still coupled to the load, but the second capacitor is disconnected from the load.

7. The electronic system as claimed in claim 1, wherein:

while the power regulator operates in the first power mode, the first capacitor and the second capacitor are both further coupled to the load; and while the power regulator operates in the second power mode, the first capacitor and the second capacitor are both kept coupled to the load.

8. The electronic system as claimed in claim 1, wherein the power regulator further comprises:

a first switch, coupled between the gate terminal of the first power MOS transistor and the gate terminal of the second power MOS transistor, wherein the first switch is closed while the power regulator operates in the first power mode, and is open while the power regulator operates in the second power mode; and a second switch, which is closed while the power regulator operates in the second power mode to couple the gate terminal of the second power MOS transistor to the power voltage.

9. The electronic system as claimed in claim 1, wherein:

the load has a first power terminal coupled to the first output terminal of the power regulator, and a second power terminal coupled to the second output terminal of the power regulator.

10. The electronic system as claimed in claim 9, wherein the load further comprises:

circuitry, receiving power from the first power terminal and the second power terminal; and a third switch, coupled between the second power terminal and the circuitry, wherein:

while the power regulator operates in the first power mode, the third switch is closed; and while the power regulator operates in the second power mode, the third switch is open.

11. The electronic system as claimed in claim 1, wherein the power regulator further comprises:

a charge supplier, powered by the power voltage, wherein while the power regulator operates in the second power mode, the charge supplier is coupled to the second capacitor through the second output terminal of the power regulator to compensate for leakage from the second capacitor.

12. The electronic system as claimed in claim 11, further comprising:

a battery, providing the power voltage.

13. The electronic system as claimed in claim 11, wherein the charge supplier comprises:

a current source, driven by the power voltage to compensate for leakage from the second capacitor.

14. The electronic system as claimed in claim 13, wherein the charge supplier further comprises:

a fourth switch, turned on while the power regulator operates in the second power mode, to couple the current source to the second capacitor through the second output terminal of the power regulator; and a comparator, generating a control signal to control the current source;

wherein the comparator has a first input terminal coupled to the second output terminal of the power regulator through the fourth switch, and a second input terminal biased at a reference voltage.

15. The electronic system as claimed in claim 1, wherein:

during a voltage-falling phase for switching from the first power mode to the second power mode, the second capacitor is changed to be disconnected from the power regulator.

16. The electronic system as claimed in claim 15, wherein:

during a voltage-rising phase for switching from the second power mode to the first power mode, the second capacitor is changed to be coupled to the power regulator.

* * * * *